A. L. WHITNEY.
Domestic Boiler.
No. 63,772.
Patented April 9, 1867.
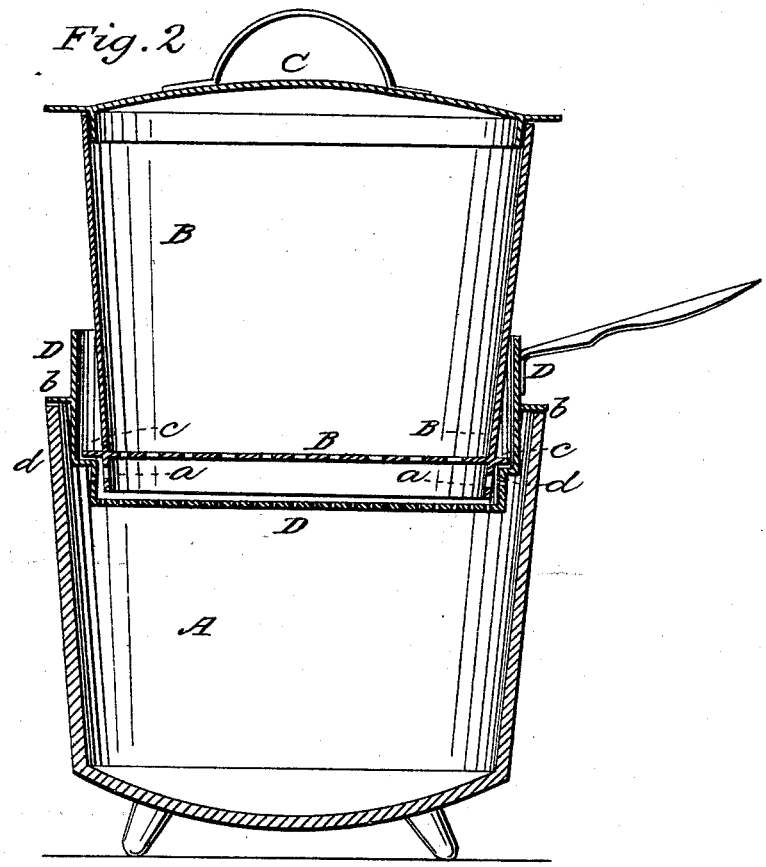
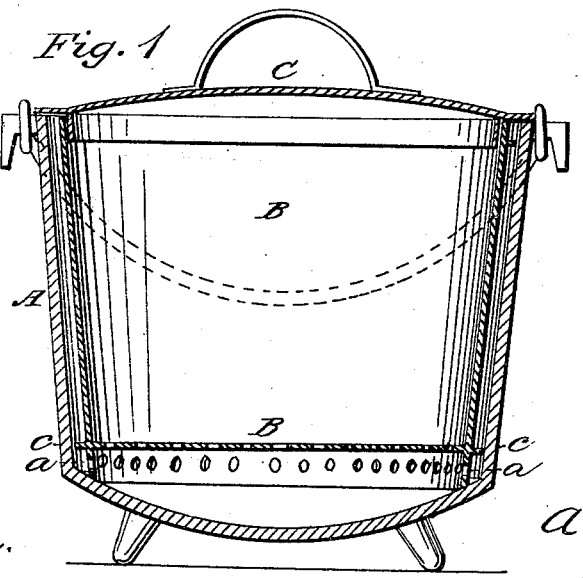
Witnesses:
Theo Tusche.
W. Trevow.
Inventor:
A. L. Whitney
per Munn & Co.
attys

United States Patent Office.

ANTHONY L. WHITNEY, OF BROOKLYN, E. D., NEW YORK.

Letters Patent No. 63,772, dated April 9, 1867.

IMPROVEMENT IN STEAMERS FOR CULINARY PURPOSES.

*The Schedule referred to in these Letters Patent and making part of the same.*

TO ALL WHOM IT MAY CONCERN:

Be it known that I, ANTHONY L. WHITNEY, of Brooklyn, E. D., in the county of Kings, and State of New York, have invented a new and improved Boiling-Kettle; and I do hereby declare that the following is a full, clear, and exact description thereof, which will enable others skilled in the art to make and use the same, reference being had to the accompanying drawings, forming part of this specification.

The object of this invention is to so arrange a kettle for culinary purposes that without removing the contents from the vessel in which they are held the same may be boiled, and then steamed, and held out of the boiling water if desired. The invention consists in the use of two perforated vessels in connection with a common cast-iron or other boiling-kettle. The vegetables, or other article to be boiled, are placed into a sheet-metal vessel, the bottom of which is perforated, and this vessel is placed into the kettle which contains the boiling water. The articles may thus be boiled at pleasure, and cannot be burned. When perfectly boiled, it may be desirable to steam the articles, and this is done by using an intermediate pan, which is placed upon the kettle, being suspended or held in place by means of some studs or flanges resting upon the rim of the kettle. The bottom of this pan is also perforated. The vessel containing the boiled articles is now held in this pan, whereby the contents are exposed to the steam but not to the water. In the annexed drawing my invention is completely illustrated—

Figure 1 being a sectional view of my apparatus, showing it in the boiling process; and Figure 2 is a similar view, the parts being in position for steaming the contents.

Similar letters of reference indicate like parts.

A is the common kettle, made of cast iron, or other suitable material, in the ordinary manner. B is the boiling-vessel, made of sheet metal, or other suitable material. The bottom of the vessel B is perforated, as shown, and is raised so that the water can enter through the perforated ring $a$, or its equivalents. A cover, C, closes the vessels A and B when B is inserted in A, as shown in fig. 2. A pan, D, which is also made of sheet metal, or of any other suitable material, may be placed upon the kettle A so as to be supported by its rim, as shown in fig. 2. A flange, $b$, on D, resting on the rim of A, acts as support for the pan D, the bottom of which is also perforated, as shown. A flange, $c$, on the vessel B, rests on a shoulder, $d$, in D, as shown, and thus B is supported in D and D in A. The flanges $b$ and $c$ prevent the steam from escaping between the outer walls of B and D and the inner walls of D and A respectively, while the vessel B is closed by the cover C, as shown in fig. 2.

I claim as new, and desire to secure by Letters Patent—

The combination of the vessels A, B, and D with each other, substantially as and for the purpose herein shown and described.

The intermediate vessel or pan D, made and operating substantially as and for the purpose herein shown and described.

ANTHONY L. WHITNEY.

Witnesses:
WM. F. McNAMARA,
ALEX. F. ROBERTS.